(No Model.)
J. A. FREY.
PITCHER FOR SIRUP, MILK, &c.
No. 357,122. Patented Feb. 1, 1887.
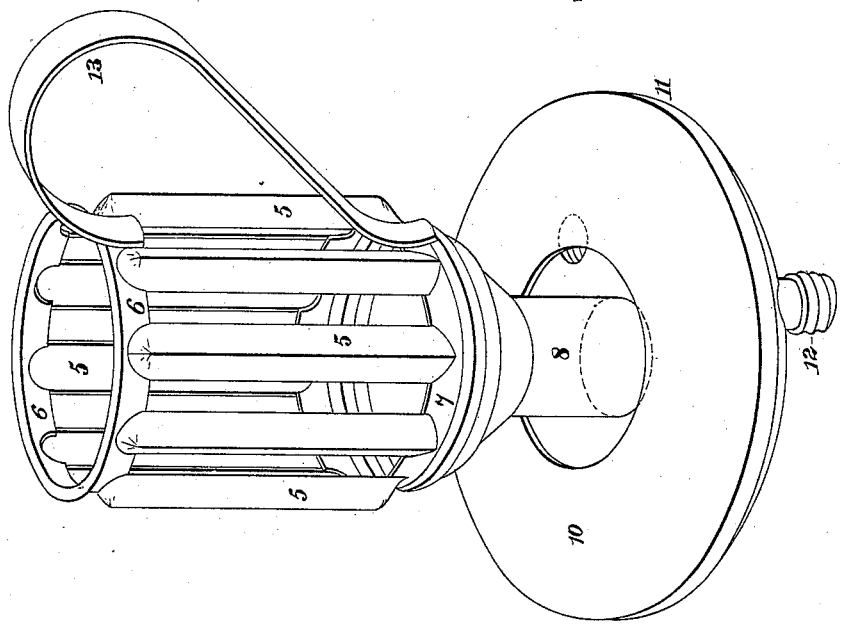
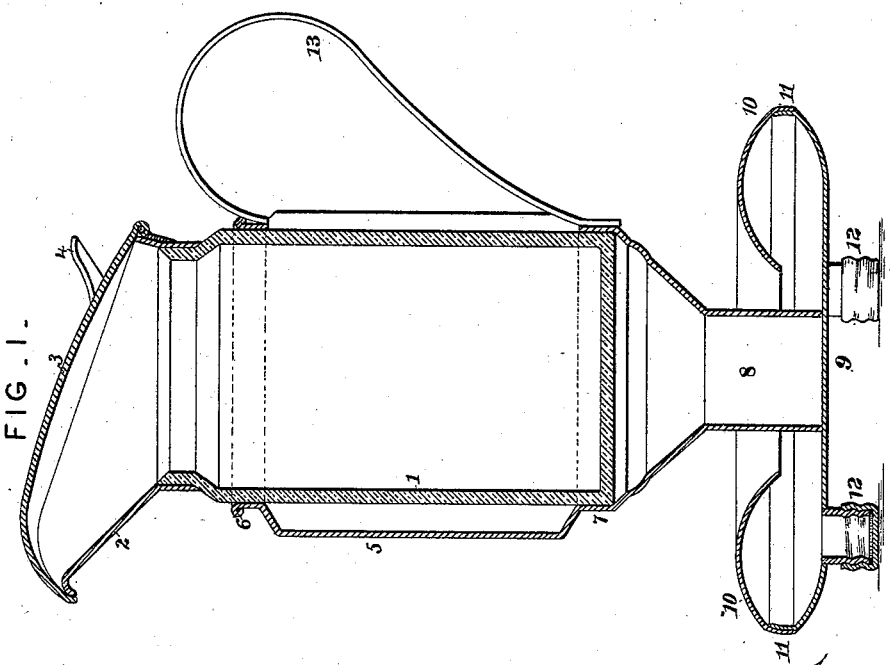
Attest:
Geo. T. Smallwood.
Philip Maure
Inventor
John A. Frey by
A. Pollok
his attorney.
N. PETERS, Photo-Lithographer, Washington, D. C.

United States Patent Office.

JOHN A. FREY, OF COLESVILLE, MARYLAND.

PITCHER FOR SIRUP, MILK, &c.

SPECIFICATION forming part of Letters Patent No. 357,122, dated February 1, 1887;

Application filed June 18, 1886. Serial No. 205,539. (No model.)

*To all whom it may concern:*

Be it known that I, JOHN A. FREY, of Colesville, in the county of Montgomery and State of Maryland, have invented a new and useful Improvement in Pitchers for Sirup, Milk, &c., which improvement is fully set forth in the following specification.

This invention has reference to the construction of pitchers or utensils for table use, designed to hold sirup, milk, cream, &c.

The pitcher consists of a glass vessel provided at the top with a lip or spout, and, preferably, also, with a cover and thumb-lifter and a metal supporting and protecting shell or case. The latter is provided with vertical trough-shaped ribs to protect the glass vessel from breakage, and also with a water-dish or pan at the bottom, to prevent ants and other insects from crawling up the sides of the vessel and getting access to the interior thereof. The water-dish or pan is so constructed that the water will not spill therefrom when the pitcher is tilted to pour out the liquid contained therein.

In the accompanying drawings, Figure I is a central vertical section of a pitcher constructed in accordance with the invention, and Fig. II a perspective view of the inclosing-case detached.

The glass vessel 1, which may be of any desired or suitable shape, is provided at the top with a metal lip or spout, 2, which is secured to the neck of vessel 1 in any suitable way, as by cement, or by a screw-joint. A hinged top, 3, having a thumb-lifter, 4, may be employed, if desired.

The inclosing metal case has a series of vertical ribs, 5, fastened above to the ring or band 6 and below to the base 7. These ribs are trough-shaped, and are arranged with the concave side inward, so as to protect the vessel 1 from the effect of accidental concussions.

The base 7 is carried by a pedestal, 8, which rests upon the plate 9, forming the bottom of the water-dish. The sides 10 of the dish turn upward and inward, so that the dish can hold a sufficient quantity of water to arrest the progress of insects, while the water therein cannot spill when the pitcher is tilted. The water-dish can conveniently be made of two parts, as shown, connected by solder or otherwise at the joint 11.

The shell may be provided with feet 12, one of which is hollow, and is provided with a screw-cap, which can be removed to draw off the water.

A handle, 13, is attached to the inclosing shell or case.

The glass vessel 1 can be lifted out of the case or shell whenever desired for cleaning or other purpose.

I do not limit myself to the precise details of construction shown and described, since it is obvious that these may be modified without departing from the spirit of the invention.

I claim—

1. In combination with a vessel or pitcher of glass or like material, a metal inclosing case or shell having concave ribs for protecting the inclosed vessel, and a water dish or pan, substantially as described.

2. In combination with the glass vessel, the metal supporting-case therefor, comprising a portion which incloses said vessel, a water pan or dish, and a contracted portion or pedestal resting in said pan or dish, substantially as described.

3. A pitcher or like table article having a water-dish whose sides project inward, and provided with feet, one of which is hollow and has a removable stopper, substantially as described.

In testimony whereof I have signed this specification in the presence of two subscribing witnesses.

JOHN A. FREY.

Witnesses:
 JULIUS KALLENAN,
 C. LEDERHOS.